United States Patent [19]

Kanaya et al.

[11] Patent Number: 5,704,969
[45] Date of Patent: Jan. 6, 1998

[54] AQUEOUS INK COMPOSITION AND METHOD OF RECORDING USING THE SAME

[75] Inventors: Miharu Kanaya; Akio Owatari, both of Suwa, Japan

[73] Assignee: Seiko Epson Corporation, Tokyo-To, Japan

[21] Appl. No.: 569,245

[22] PCT Filed: Apr. 25, 1995

[86] PCT No.: PCT/JP95/00815

§ 371 Date: Apr. 16, 1996

§ 102(e) Date: Apr. 16, 1996

[87] PCT Pub. No.: WO95/29208

PCT Pub. Date: Nov. 2, 1995

[30] Foreign Application Priority Data

Apr. 25, 1994 [JP] Japan .................. 6-086731
Apr. 25, 1994 [JP] Japan .................. 6-086732

[51] Int. Cl.$^6$ .................................... C09D 11/02
[52] U.S. Cl. .................................. 106/31.48; 106/31.43
[58] Field of Search ............... 106/22 D, 22 K, 106/22 H, 20 D, 31.48, 31.43

[56] References Cited

U.S. PATENT DOCUMENTS

| | | | |
|---|---|---|---|
| 4,632,703 | 12/1986 | Koike et al. | 106/22 D |
| 4,732,615 | 3/1988 | Kawashita et al. | 106/22 D |
| 5,123,960 | 6/1992 | Shirota et al. | 106/22 D |
| 5,296,023 | 3/1994 | Gregory et al. | 106/22 D |
| 5,501,710 | 3/1996 | Wunderlich | 106/22 D |

FOREIGN PATENT DOCUMENTS

| | | |
|---|---|---|
| 59-22967 | 2/1984 | Japan . |
| 59-30874 | 2/1984 | Japan . |
| 61-2772 | 1/1986 | Japan . |
| 62-34970 | 2/1987 | Japan . |
| 62-149758 | 7/1987 | Japan . |
| 62-190273 | 8/1987 | Japan . |
| 3200883 | 9/1991 | Japan . |
| 6-16982 | 1/1994 | Japan . |

OTHER PUBLICATIONS

Abstract of JP59/022967, Feb. 1984.
Abstract of JP59/030874, Feb. 1984.
Abstract of JP06/169982, Jun. 1994.

*Primary Examiner*—Helene Klemanski
*Attorney, Agent, or Firm*—Ladas & Parry

[57] ABSTRACT

A cyan ink comprising a phthalocyanine derivative represented by the following formula (I), excellent in color reproducibility, suitable for use in the ink jet recording method is disclosed. The combination use of this cyan ink comprising the phthalocyanine derivative with yellow and magenta inks, each comprising a specific dye, gives excellent color printing.

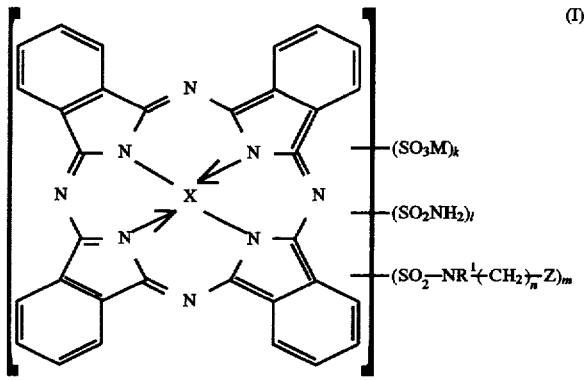

wherein X represents an ion of a metal selected from Cu, Fe, Co and Ni, $R^1$ represents H or an alyl group, Z represents —O, —COOH or $NR^2R^3$ (where $R^2$ represents H or an alkyl group, and $R^3$ represents an alkyl group or phenyl group), n represents an integer of 1 to 15, k and l represent 0 or 1, and m represents an integer of 1 to 4, provided that k, l and m fulfill the inequality $2 \leq k+l+m \leq 4$.

7 Claims, No Drawings

AQUEOUS INK COMPOSITION AND METHOD OF RECORDING USING THE SAME

BACKGROUND OF THE INVENTION

1. Field of the Invention

The present invention relates to an ink composition for recording, and to a method of recording, in particular, an ink jet recording method, using the same. More particularly, the present invention relates to an ink composition comprising as a colorant a phthalocyanine derivative, to a method of recording, in particular, an ink jet recording method, using the same, and to a method for forming color images.

2. Background Art

Ink compositions are required to have various excellent properties. Specifically, they are not only required to have excellent color reproducibility, but also required to produce images which are excellent in water resistance and light resistance.

Further, in the ink jet recording method in which droplets of an ink composition are ejected on a recording medium to form thereon an image, the ink composition is required to have much more excellent properties than those required for ordinary writing utensils such as fountain pens and ball-point pens. For instance, the ink composition is required to have a proper viscosity and a suitable surface tension, to be excellent in preservation stability, and not to cause clogging in a nozzle.

In general, many of these properties required for the ink composition for use in the ink jet recording method can be fulfilled by an aqueous ink composition comprising a water-soluble dye water and a water-soluble organic solvent. The properties of printed images, such as color tone, water resistance and light resistance, are highly dependent on the dye used. It has been tried to utilize various dyes.

Ink compositions containing a phthalocyanine derivative as a cyan or blue dye have been proposed. For instance, the use of C. I. Direct Blue 86, 87 or 199 has been proposed. Further, the use of a phthalocyanine derivative is also disclosed, for example, in Japanese Laid-Open Patent Publications Nos. 2772/1986, 149758/1987, 190273/1987 and 200883/1991.

However, there is yet room for improvement in these ink compositions containing a phthalocyanine derivative.

On the other hand, such a printer that produces color images by means of the ink jet printing method is also popular. Color images are formed by using, in general, yellow, magenta and cyan ink compositions, and optionally a black ink composition. By superposing these ink compositions, red, green, and blue, and optionally black colors are developed. In such color printing, each ink composition is required to be highly reproducible in its own color. In addition to this, these ink compositions are required to be excellent in reproducibility in red, green, and blue, and optionally black colors which are developed by superposing ink compositions one over another.

SUMMARY OF THE INVENTION

We have now found that an ink composition comprising as a colorant a specific phthalocyanine derivative has extremely excellent properties. Furthermore, we have also found that excellent color printing can be obtained by the use of the combination of this cyan ink composition with yellow and magenta ink compositions, each comprising a specific dye.

Accordingly, an object of the present invention is to provide an ink composition having various properties which are required for ink compositions.

Another object of the present invention is to provide an ink composition having various properties which are required for ink compositions useful for ink jet recording.

A further object of the present invention is to provide a method of printing, in particular, an ink jet recording method, by which excellent color images can be obtained.

According to the present invention, there provides a cyan ink composition comprising as a colorant a phthalocyanine derivative represented by the following formula (I):

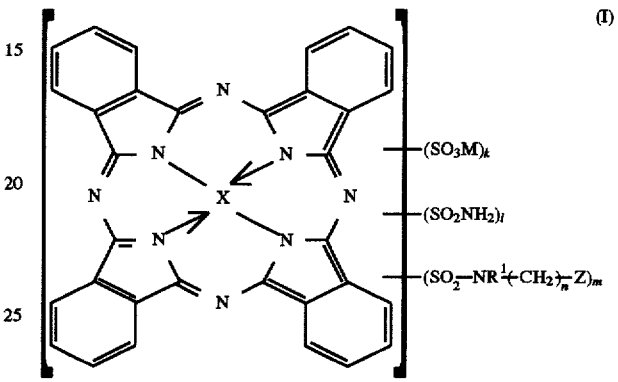

wherein

X represents an ion of a metal selected from Cu, Fe, Co and Ni,

M represents hydrogen atom, an alkali metal, ammonium or an organic amine, $R^1$ represents hydrogen atom or an alkyl group which may be substituted, Z represents —OH, —COOH or $NR^2R^3$ (where $R^2$ represents hydrogen atom or an alkyl group which may be substituted, and $R^3$ represents an alkyl group which may be substituted, or phenyl group which may be substituted), n represents an integer of 1 to 15, k and l each independently represent 0 or 1, and m represents an integer of 1 to 4, provided that k, l and m fulfill the inequality $2 \leq k+l+m \leq 4$.

According to the present invention, there provides a method in which yellow, magenta and cyan ink compositions are used, wherein the cyan ink composition comprises as a colorant the compound represented by the above formula (I), the yellow ink composition comprises as a colorant a compound represented by the following formula (II):

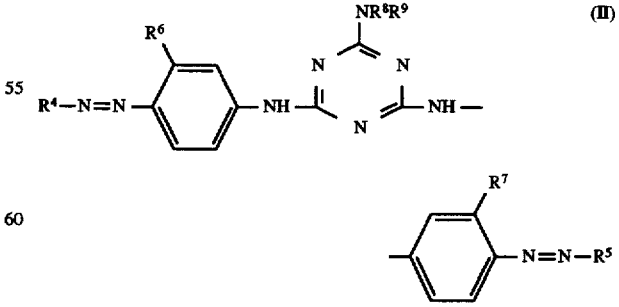

wherein $R^4$ and $R^5$ each independently represent —OH; —$SO_3M$; or phenyl or naphthyl group substituted with —COOM, $R^6$ and $R^7$ each independently represent hydrogen atom, an alkyl group or an alkoxy group, $R^8$ represents hydrogen atom, an alkyl group or a hydroxyalkyl group, $R^9$ represents hydrogen atom, —OH or a hydroxyalkyl group, and M is as defined in the above formula (I), or a compound represented by the following formula (III):

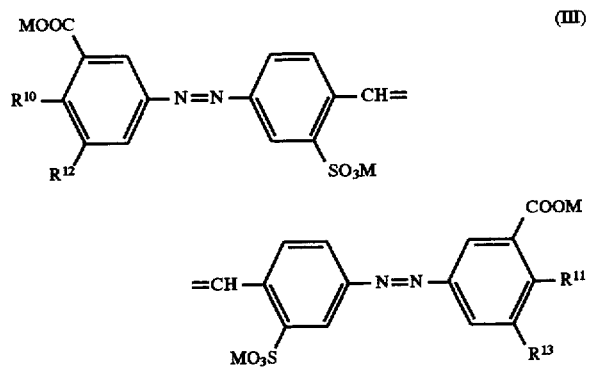

wherein $R^{10}$ and $R^{11}$ each independently represent hydrogen atom, —OH or an alkoxy group, $R^{12}$ and $R^{13}$ each independently represent hydrogen atom or an alkyl group, and M is as defined in the above formula (I), and the magenta ink composition comprises as a colorant a compound represented by the following formula (IV):

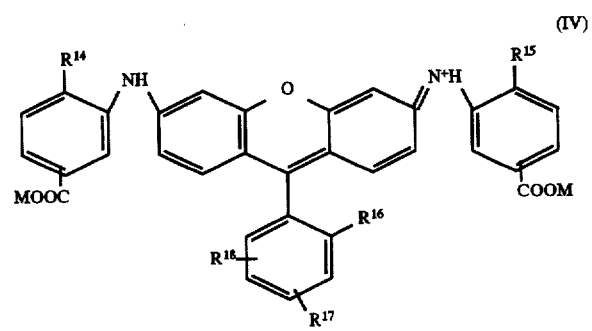

wherein $R^{14}$ represents hydrogen atom or an alkyl group, $R^{15}$ represents hydrogen atom, a halogen atom or an alkyl group, $R^{16}$ represents —COOH or —$SO_3^-$, $R^{17}$ and $R^{18}$ each independently represent hydrogen atom, a halogen atom, an alkyl group or —$SO_3M$, and M is as defined in the above formula (I).

DETAILED DESCRIPTION OF THE INVENTION

Phthalocyanine Derivatives

The phthalocyanine derivative for use in the cyan ink composition according to the present invention is a compound represented by the above formula (I).

In the formula (I), hydrogen atoms on four benzene rings in the phthalocyanine skeleton are substituted with the groups —$(SO_3M)k$, —$(SO_2NH_2)l$ and —$(SO_2—NR^1—(CH_2)N—Z)m$. While the position of the substitution is not particularly limited, among the above three groups, the group —$(SO_2—NR^1—(CH_2)N—Z)m$ should exist in a number of at least one. The above groups can exist in a number of four or less in total. In other words, it is necessary that k and l represent an integer of 0 or 1, that m be an integer of 1 to 4, and that k, l and m be in the relationship which fulfills the inequality $2 \leq k+l+m \leq 4$.

In the formula (I), X represents an ion of a metal selected from Cu, Fe, Co and Ni.

Specific examples of the alkali metal and the organic amine represented by M in the formula (I) include lithium, sodium, potassium, ammonium, dimethylammonium, morpholium and piperidinium.

The alkyl group represented by $R^1$ in the formula (I) is preferably a linear or branched $C_{1-4}$ alkyl group. One or more hydrogen atoms in this alkyl group may be substituted, and preferable examples of the substituent include hydroxyl group and amino group.

In $NR^2R^3$ represented by Z in the formula (I), $R^2$ represents hydrogen atom or an alkyl group. This alkyl group is preferably a linear or branched $C_{1-4}$ alkyl group. One or more hydrogen atoms in this alkyl group may be substituted, and preferable examples of the substituent include hydroxyl group and amino group. Further, $R^3$ represents an alkyl group or phenyl group. This alkyl group is preferably a linear or branched $C_{1-4}$ alkyl group. One or more hydrogen atoms in this alkyl group may be substituted, and preferable examples of the substituent include hydroxyl group and amino group. Furthermore, one or more hydrogen atoms on the phenyl group may be substituted, and examples of the substituent include hydroxyl group and amino group.

In the formula (I), n represents an integer of 1 to 15. However, when Z is —COOH, n is preferably an integer of 2 to 12; and when Z is —OH, n is preferably an integer of 5 to 15.

Specific preferable examples of the phthalocyanine derivative represented by the formula (I) include the following compounds (I-1) to (I-16):

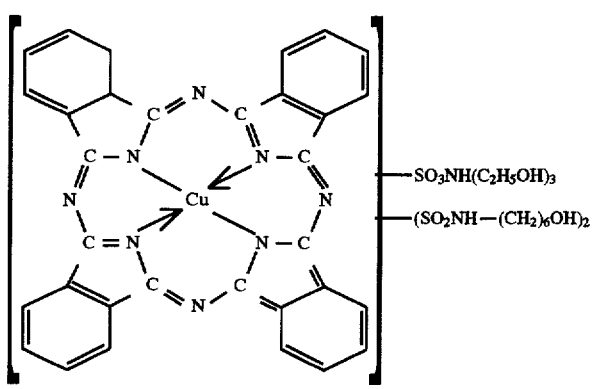
(I-1)
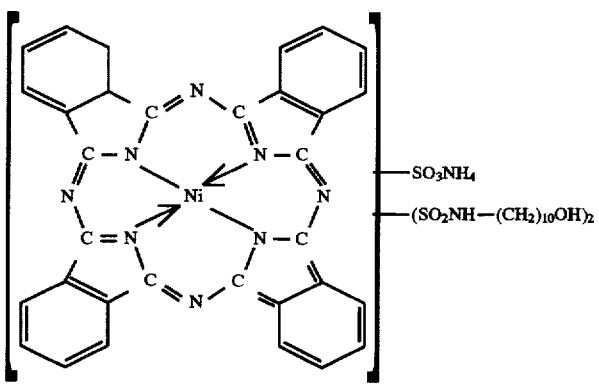
(I-2)
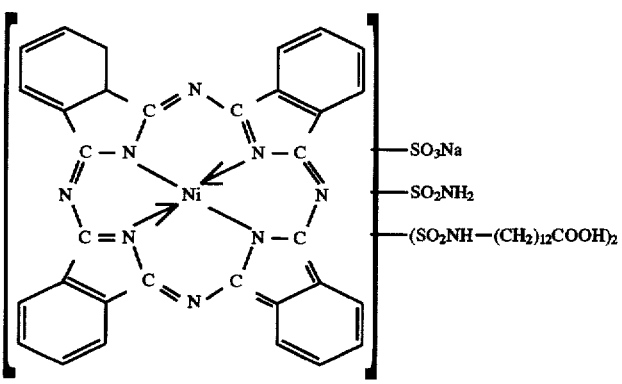
(I-3)
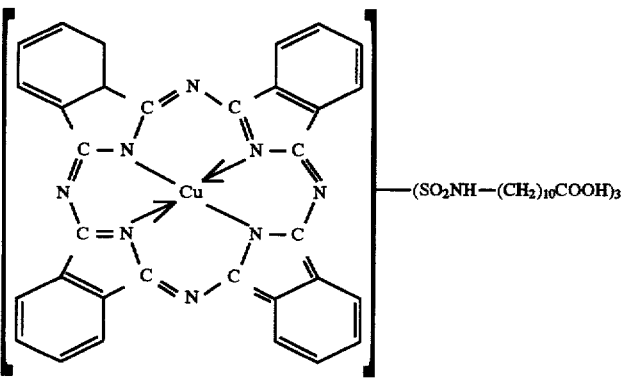
(I-4)

-continued
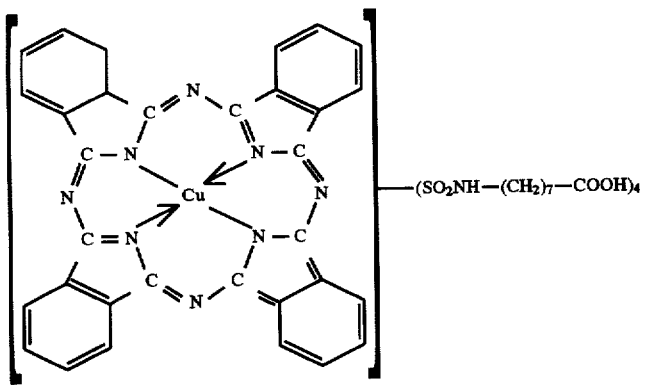
(I-5)
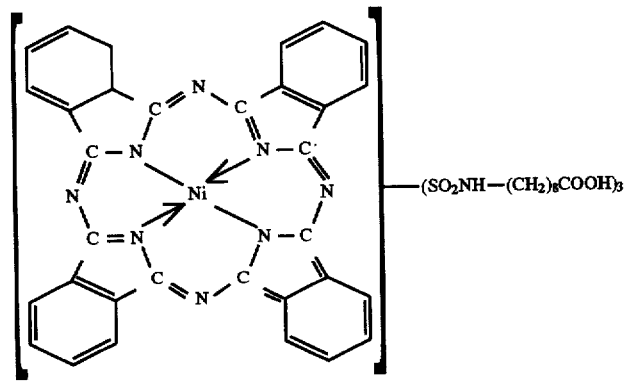
(I-6)
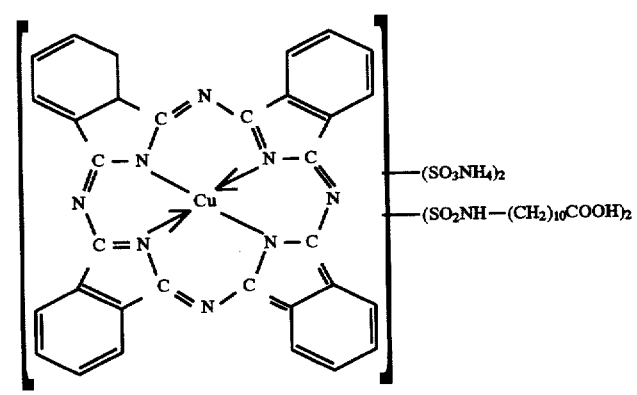
(I-7)
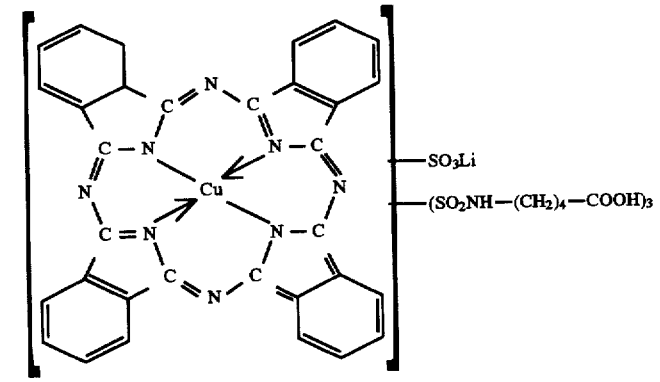
(I-8)

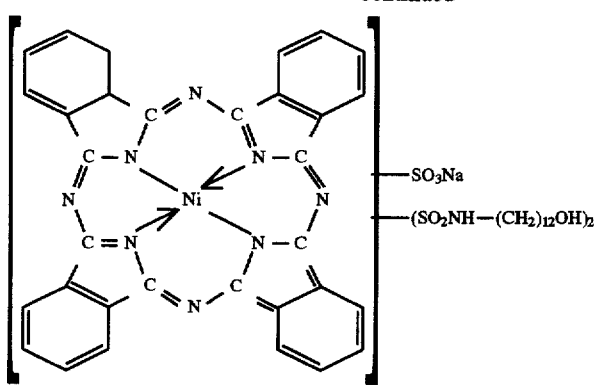
(I-9)
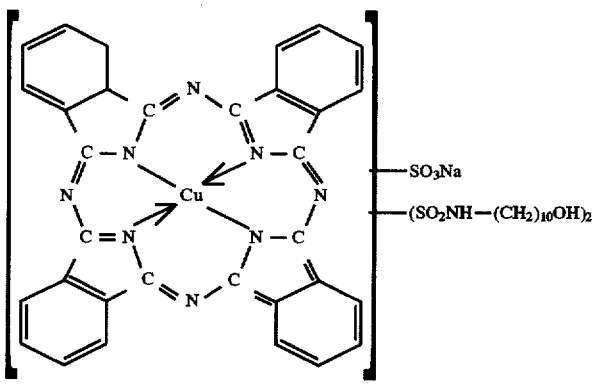
(I-10)
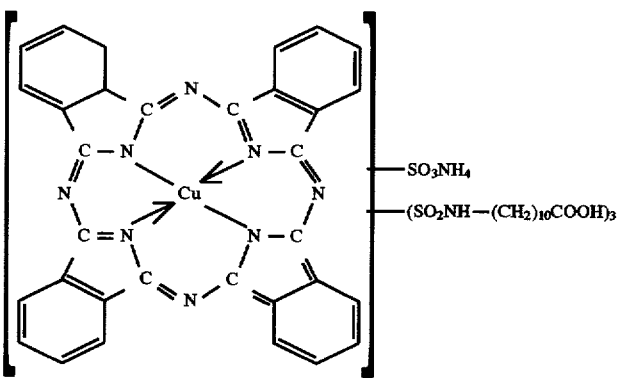
(I-11)
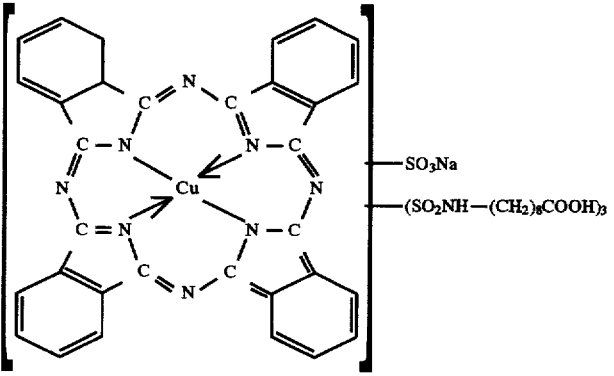
(I-12)

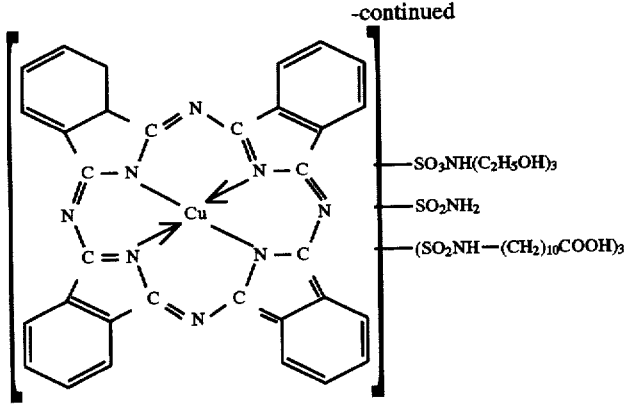
(I-13)

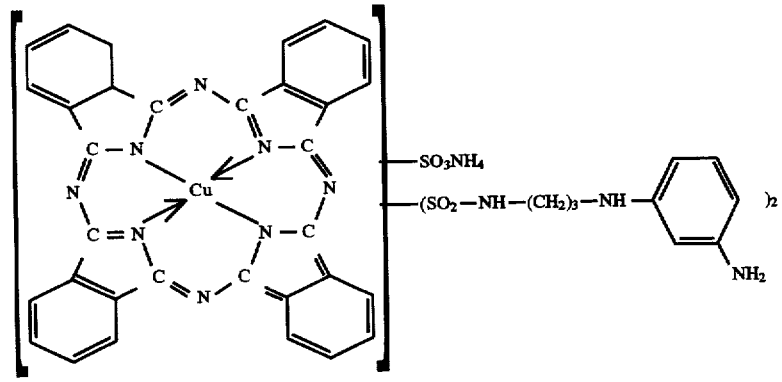
(I-14)

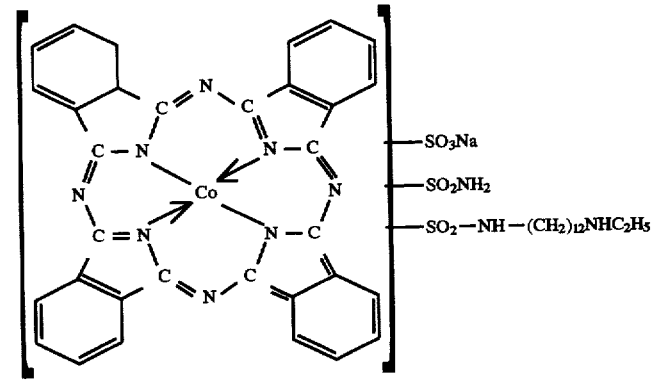
(I-15)

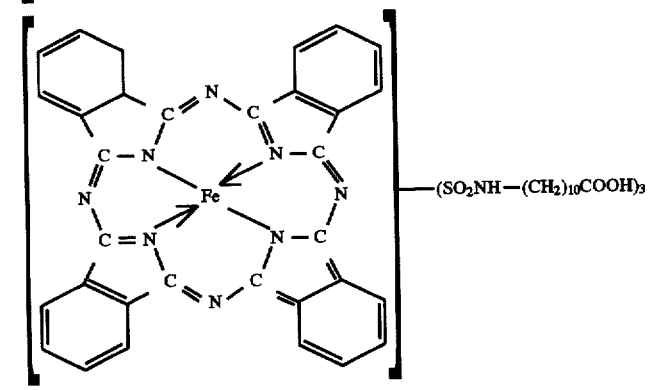
(I-16)

The compound having the formula (I) can be produced in accordance with a known method for preparing a phthalocyanine derivative. For example the compound (I) can be obtained in accordance with the method described in Japanese Laid-Open Patent Publication No. 22967/1984 or Japanese Laid-Open Patent Publication No. 30874/1984.

The compound having the formula (I) can be produced by the following method. The compound (I) can be prepared by reacting a compound represented by the following formula (Va):

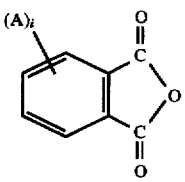

(Va)

wherein A represents the group —(SO$_3$M)k, —(SO$_2$NH$_2$)l or —(SO$_2$—NR$^1$—(CH$_2$)N—Z)m (where M, R$^1$, z, k, l and m are as defined in the formula (I)), and i represents an integer of 1 to 4, or a mixture of the compound (Va) and a compound represented by the following formula (Vb):

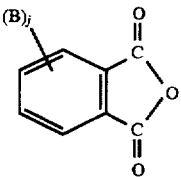

(Vb)

wherein B represents the group —(SO$_3$M)k, —(SO$_2$NH$_2$)l or —(SO$_2$—NR$^1$—(CH$_2$)N—Z)m (where M, R$^1$, Z, k, l and m are as defined in the formula (I)), and j represents an integer of 1 to 4, with urea and a metal chloride represented by the formula XCln (where n agrees with the valency of X). In this reaction excessive urea dissolved may also play a role of a reaction solvent, and the reaction can be carried out at a temperature of preferably about 190° to 200° C.

The values of k, l and m in the compound having the formula (I) can be controlled by properly selecting the type and the mixing ratio of the compounds (Va) and (Vb).

Further the compound (I) can be prepared from a compound of the formula (VIa):

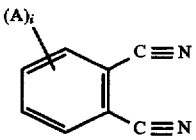

(VIa)

wherein A and i are as defined above, or the compound (VIa), and a compound of the formula (VIb):

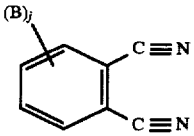

(VIb)

wherein B and j are as defined above, with a metal chloride represented by the formula XCln (where n agrees with the valency of X). The reaction is carried out by:

(a) mixing these compounds and heating the mixture, for example, at a temperature of approximately 150° to 200° C., or (b) heating the mixture at a temperature of approximately 190° to 200° C. in an inert solvent in the presence or absence of urea.

Also in this method, the values of k, l and m in the compound (I) can be controlled by properly selecting the type and the mixing ratio of the compounds (VIa) and (VIb).

The amount of the compound (I) to be incorporated into the ink composition can be properly determined depending upon the type of the solvent component used, the properties required for the ink. However, in the case where the ink composition will be used in the ink jet recording method, the incorporation amount of the compound (I) is preferably from 1.5 to 8.0% by weight, more preferably from 2.5 to 6.5% by weight of the ink composition from the viewpoint of color tone.

Further, a mixture of water and a water-soluble organic solvent is preferred as the solvent for use in ink composition of the present invention. Examples of this water-soluble organic solvent include polyhydric alcohols such as ethylene glycol, diethylene glycol, triethylene glycol, polyethlene glycol, propylene glycol, 1,3-propane diol, 1,5-pentane diol, 1,2,6-hexane triol and glycerol; ethers of polyhydric alcohols such as ethylene glycol monomethyl ether, diethylene glycol monobutyl ether, triethylene glycol monobutyl ether and dipropylene glycol monomethyl ether; nitrogen-containing solvents such as formamides, dimethylformamide, diethanolamine, triethanolamine, 1,3-dimethyl-2-imidazolidinone, 2-pyrrolidone and N-methyl-2-pyrrolidone; and sulfur-containing solvents such as thiodiglycol and dimethyl sulfoxide.

These solvents can be used either singly or as a mixture of two or more. The amount of the solvent is in the range of 3 to 40% by weight, preferably in the range of 3 to 30% by weight of ink composition from the view point of the prevention of clogging in a nozzle and the quality of images printed.

Further, in order to enhance the drying characteristics of the ink after the formation of an image, it is preferable that the ink composition of the present invention further comprise a lower alcohol such as ethanol, 1-propanol or 2-propanol; an anionic surface active agent such as a fatty acid salt or an alkylsulfate ester; or a nonionic surface active agent such as acetylene glycol, a polyoxyethylene alkyl ether or a polyoxyethylene fatty ester. From the viewpoint of the quality of images printed, the amount of the lower alcohol to be incorporated is preferably in the range of 2 to 10% by weight, more preferably in the range of 2 to 6% by weight of the ink composition. The amount of the surface active agent to be incorporated is preferably in the range of 0.01 to 2% by weight of the ink composition.

The ink composition according to the present invention may further comprise a water-soluble polymer or resin, an anti-foaming agent, a pH modifier, a mildew-proofing agent and the like, if necessary.

The ink composition of the invention can be produced in a conventional manner. For instance, the ink can be obtained by the following method: all of the components are thoroughly mixed and dissolved, and the mixture is filtered under pressure through a membrane filter having a hole diameter of 0.8 micrometers, and then degased by using a vacuum pump.

The ink composition according to the present invention is particularly suitable for use in the ink jet recording method in which an ink is ejected through a fine pore as droplets to conduct recording. The ink composition of the invention can also be used for ordinary writing utensils, recorders, pen plotters and the like.

In the case of the ink jet recording method, it is possible to achieve excellent image recording by adopting, in particular, a means in which droplets are ejected by utilizing the vibration of a piezoelectric device, or a means in which thermal energy is utilized.

Formation of Color Images

According to another preferred embodiment of the present invention, there is provided a method for producing color images, in which the ink composition comprising the compound (I) above described, and specific yellow and magenta ink compositions are used.

The yellow ink composition for use in this embodiment comprises as a colorant a compound represented by the above formula (II) or (III). Further, the magenta ink composition for use in this embodiment comprises as a colorant a compound represented by the above formula (IV).

By using these ink compositions in combination, color images whose colors are well reproduced can be formed. These ink compositions are highly reproducible in their own colors, and, in addition to this, they are excellent in reproducibility in red, green, blue and black colors which are obtained by superposing two of or all of the ink compositions one over another.

In the formula (II), one or more hydrogen atoms in the phenyl or naphthyl group represented by $R^4$ or $R^5$ may be substituted. Specific examples of the substituent include hydroxyl group, —$SO_3M$, —COOM, —$PO_3M_2$ (where M is as defined above), an alkyl group (preferably a $C_{1-4}$ alkyl group), and an alkoxy group (preferably a $C_{1-4}$ alkoxy group).

In the formula (II), the alkyl group represented by $R^6$ or $R^7$ is preferably a linear or branched $C_{1-3}$ alkyl group. The alkoxy group represented by $R^6$ or $R^7$ is preferably a linear or branched $C_{1-4}$ (preferably $C_{1-2}$) alkoxy group.

The alkyl group represented by $R^8$ is preferably a linear or branched $C_{1-3}$ alkyl group. The alkyl moiety of the hydroxyalkyl group represented by $R^8$ is a linear or branched $C_{1-4}$ (preferably $C_{1-2}$) alkyl group.

Further, the alkyl moiety of the hydroxyalkyl group represented by $R^9$ is a linear or branched $C_{1-4}$ (preferably $C_{1-2}$) alkyl group.

Specific preferable examples of the compound represented by the formula (II) include the following compounds (II-1) to (II-10):

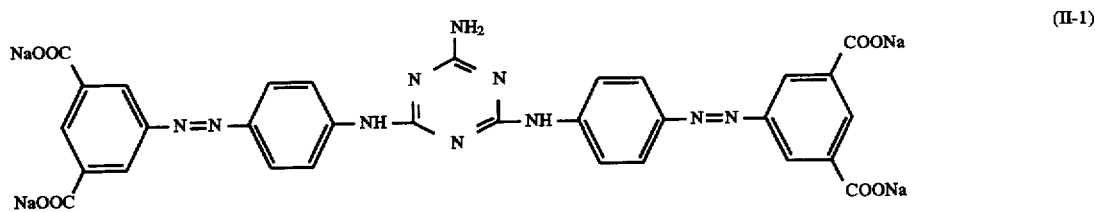
(II-1)

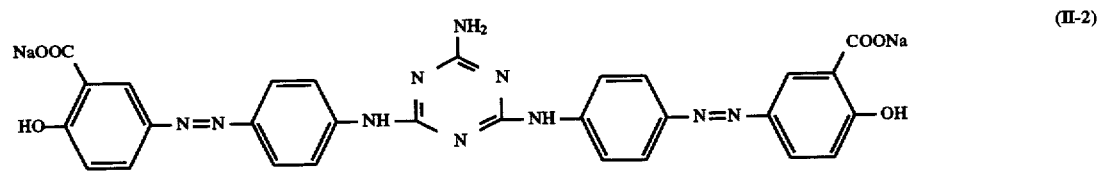
(II-2)

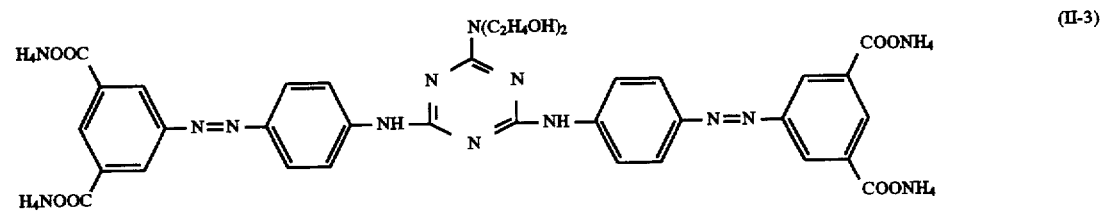
(II-3)

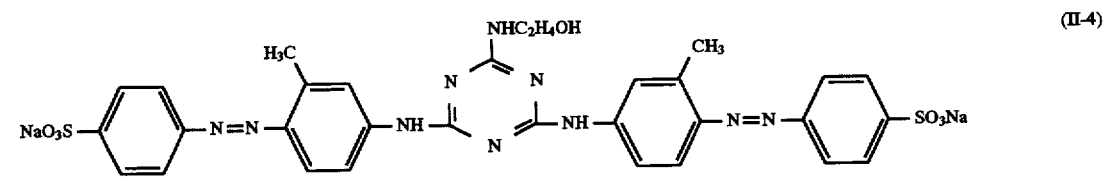
(II-4)

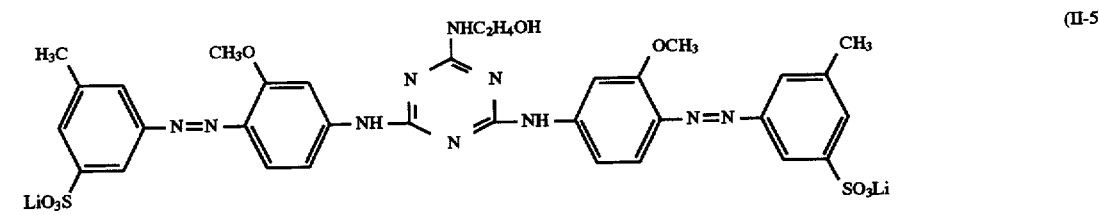
(II-5)

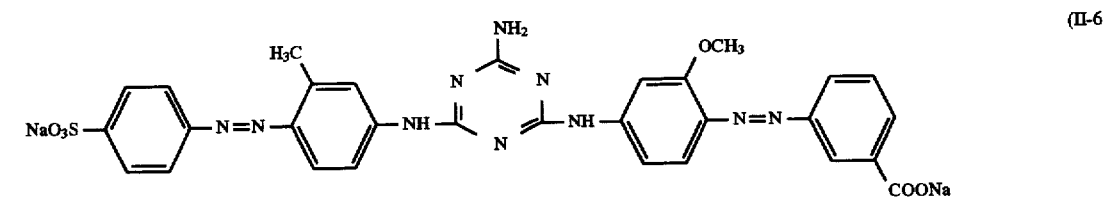
(II-6)

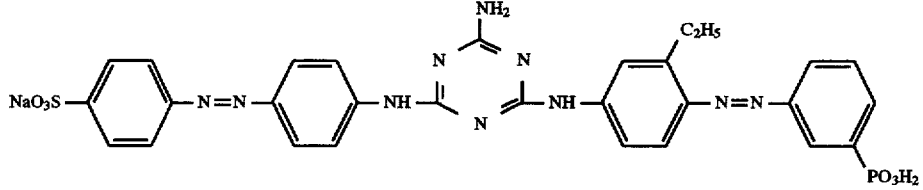
(II-7)

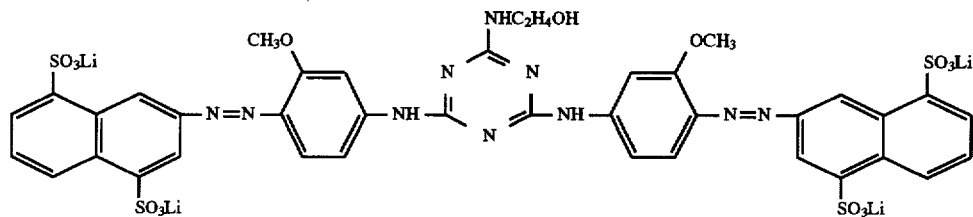
(II-8)

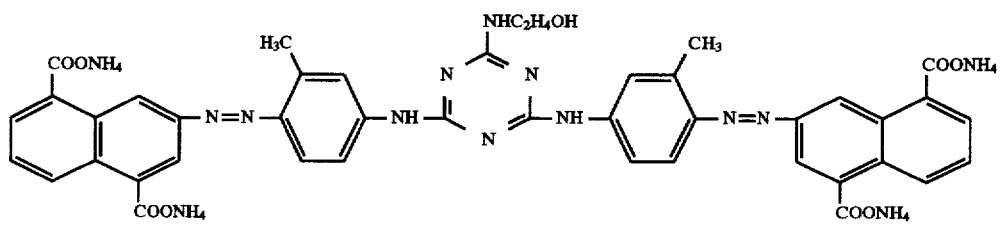
(II-9)

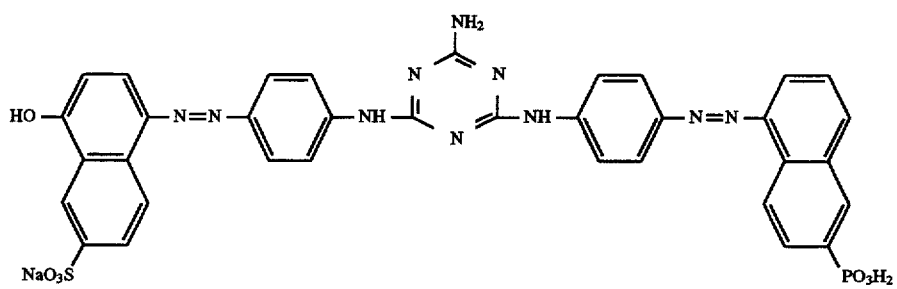
(II-10)

The alkoxy group represented by $R^{10}$ or $R^{11}$ in the formula (III) is a linear or branched $C_{1-4}$ (preferably $C_{1-2}$) alkoxy group.

Further, the alkyl group represented by $R^{12}$ or $R^{13}$ is preferably a linear or branched $C_{1-4}$ alkyl group.

Specific preferable examples of the compound represented by the formula (III) include the following compounds (III-1) to (III-10):

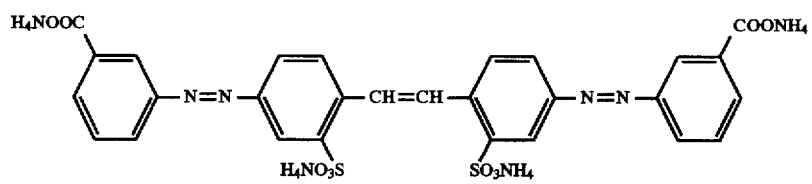
(III-1)

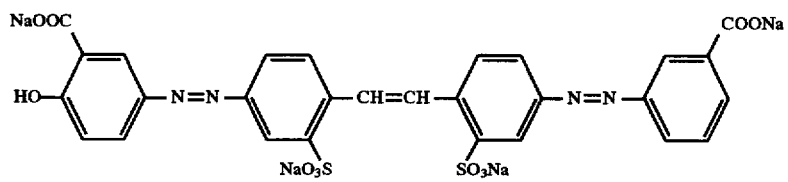
(III-2)

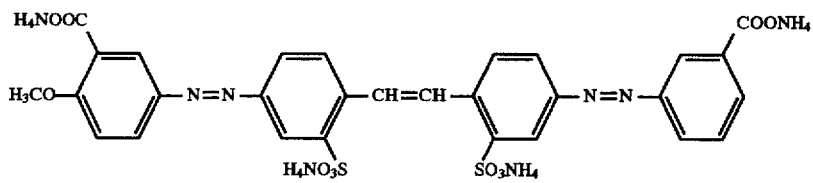
(III-3)

-continued

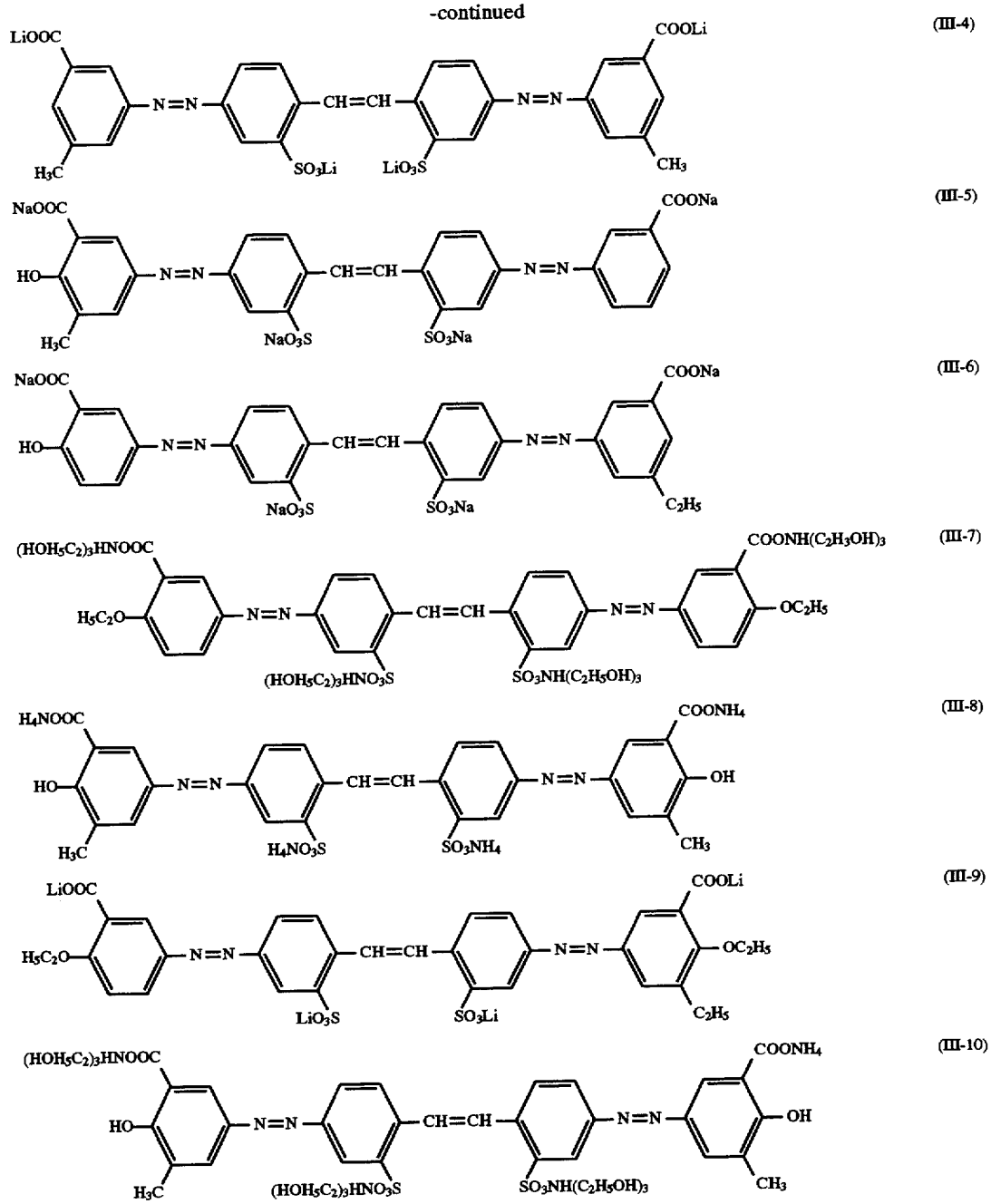

The alkyl group represented by $R^{14}$ in the formula (IV) is preferably a linear or branched $C_{1-4}$ alkoxy group.

Further, the halogen atom represented by $R^{15}$ is preferably fluorine, chlorine, bromine or iodine. Furthermore, the alkyl group represented by $R^{15}$ is preferably a linear or branched $C_{1-4}$ alkyl group.

The halogen atom represented by $R^{17}$ or $R^{18}$ is preferably fluorine, chlorine, bromine or iodine. Further, the alkyl group represented by $R^{17}$ or $R^{18}$ is preferably a linear or branched $C_{1-4}$ alkyl group.

Specific preferable examples of the compound represented by the formula (IV) include the following compounds (IV-1) to (IV-10):

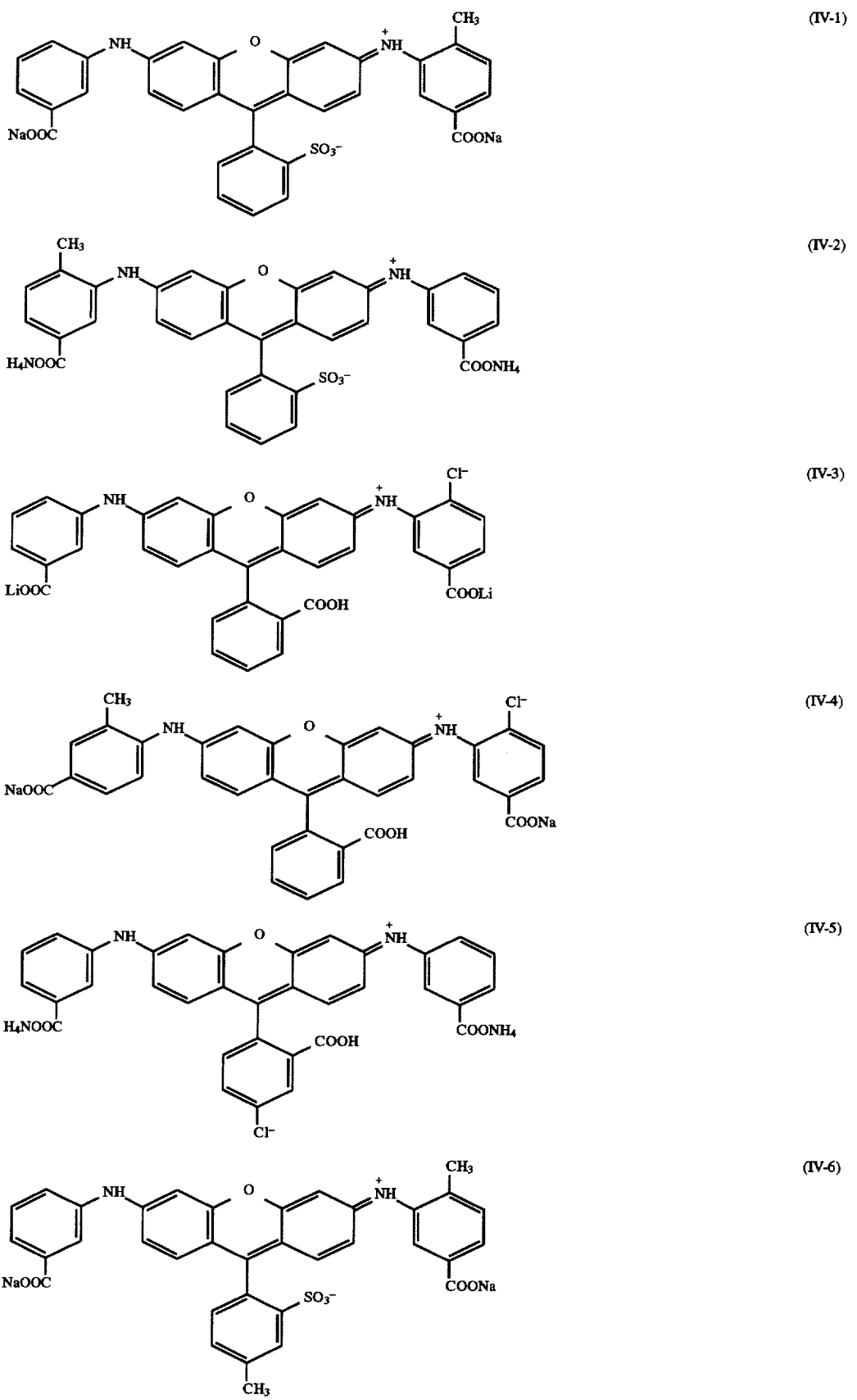

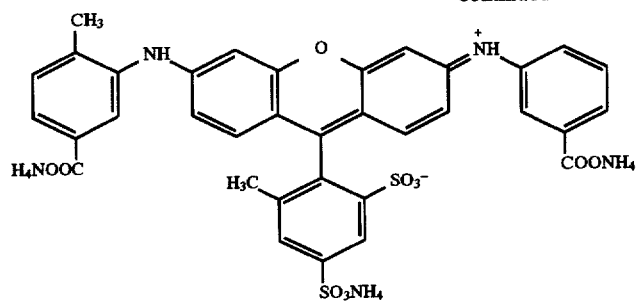
(IV-7)

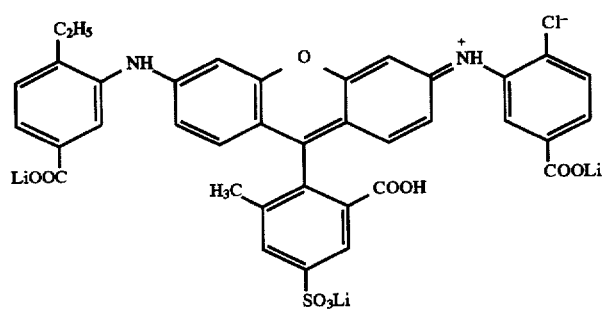
(IV-8)

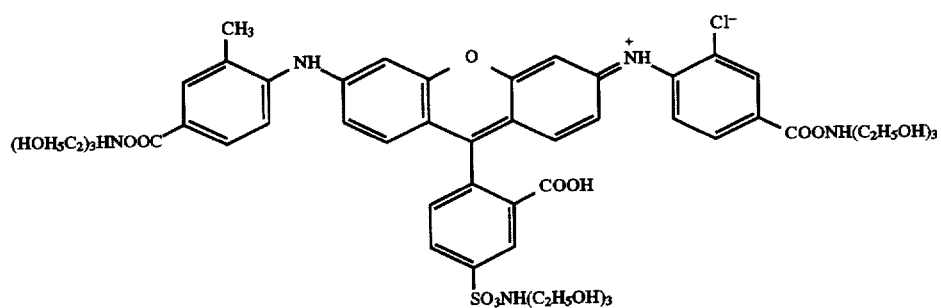
(IV-9)

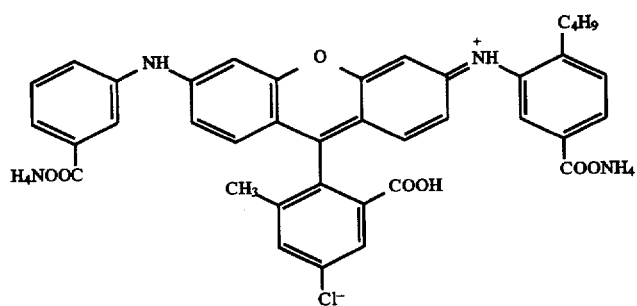
(IV-10)

The ink composition comprising the compound (II), (III) or (IV) can be formulated and prepared in the same manner as in the case of the ink composition comprising the compound (I). According to the preferred embodiment of the present invention, in the case where an image will be formed by the ink jet printing method, the amount of the compound (II) or (III) to be incorporated into the ink composition is preferably about 0.5 to 3.0% by weight, more preferably about 1.0 to 2.0% by weight of the ink composition. Further, in the case of the compound (IV), the amount thereof is preferably about 0.5 to 4.0% by weight, more preferably about 1.0 to 3.0% by weight of the ink composition.

EXAMPLES

The present invention will now be explained more specifically by referring to the following Examples. However, the present invention is not limited to these examples.

Example A

Inks, each having the composition shown in Table 1 were prepared in a conventional manner. In the table, figures are in "% by weight" of the ink composition and the balances are water.

TABLE 1

| Formulation of Ink | Example A 1 | 2 | 3 | 4 | 5 | 6 | 7 | 8 | 9 | 10 | Comparative Example A 1 | 2 | 3 |
|---|---|---|---|---|---|---|---|---|---|---|---|---|---|
| Dye | | | | | | | | | | | | | |
| (I-1) | 8 | 6 | 4 | | | 2 | | | | | 1 | | |
| (I-5) | | | | 1.5 | | | | | | | 1 | | |
| (I-7) | | | | | 2.5 | 2 | | | | | | | |
| (I-8) | | | | | | | 3.5 | | | | | | |
| (I-9) | | | | | | | | 6.5 | | | | | |
| (I-11) | | | | | | | | | 3 | | | | |
| (I-14) | | | | | | | | | | 1 | | | |
| C.I. Acid Blue 9 | | | | | | | | | | | 3 | | |
| C.I. Direct Blue 86 | | | | | | | | | | | | 4 | 3 |
| Ethylene glycol | | | | | 10 | | | | | | | | |
| Diethylene glycol | 40 | 30 | 10 | | | 15 | 17 | | 15 | | 10 | 10 | |
| Glycerol | | | 5 | 3 | 4 | | | 8 | | 5 | 5 | 5 | 5 |
| Diethylene glycol monobutyl ether | | | | | | | 10 | | | | | | |
| Triethylene glycol monobutyl ether | | | | | | | | | 12 | 10 | | | |
| Triethanolamine | | | | 1 | | 1 | | | | | | | |
| 2-Pyrrolidone | | | | 3 | | | | | | | | | |
| Thiodiglycol | | | | | | | | 8 | | | | | 8 |
| Ethanol | | | | 4 | | | | | | | | | |
| 1-Propanol | | 6 | | | | | | | | | 3 | | 3 |
| Surfynol 465* | | 1 | | | | 0.8 | | | 1.5 | | 1 | 1 | |
| Mildew-proofing agent | | | 0.3 | 0.3 | 0.3 | 0.3 | | | | | | 0.3 | 0.3 |

*: Surfynol 465 (manufactured by Nisshin Kagaku Kabushiki Kaisha, acetylene glycol surface active agent)

Evaluation Test A

The ink compositions of Examples A1 to A10 and of Comparative Examples A1 to A3 were evaluated in terms of the following Tests A1 to A4, by using the following printer and recording papers.

Printer

Printer (1): An ink jet printer having an on-demand-type ink jet head (diameter of nozzle: 35 micrometers, 48 nozzles) made on an experimental basis, which produces droplets by utilizing the vibration of a piezoelectric device to conduct recording; the printer can print an image under such conditions that the driving frequency is 5 kHz, that the voltage for driving the piezoelectric device is 25 V and that the resolution is 360 dots/inch.

Printer (2): Desk Writer 550C (manufactured by Hewlett Packard Corp.)

Recording Papers (1) Coated paper NM for ink jet printing (manufactured by Mitsubishi Paper Mills)
(2) Canon Dry (manufactured by Canon Hanbi)
(3) Xerox 4024 (manufactured by Xerox)
(4) Xerox P (manufactured by Fuji Xerox)
(5) Ricopy 6200 (manufactured by Ricoh)

Test A1: Color Reproducibility

A solid image (100% duty) was printed by the printer (1) on each of the recording papers (1) to (5) by using each of the inks of Examples and Comparative Examples.

With respect to the solid image (3×3 cm) of each color, the color-scale values L*, a* and b* according to the color-difference indicating system defined by CIE (Commision International de l'Eclairage) were measured by Macbeth CE-7000 spectrophotometer (manufactured by Macbeth Corp.). The difference between the color-scale values measured and the color reference values of cyan according to ISO 2845-1975, shown below were obtained, and the color difference was calculated by the following equation (i).

TABLE 2

| | L* | a* | b* |
|---|---|---|---|
| Color reference values of cyan | 53.9 | −19.1 | −54.2 |

Equation (i):

$$\Delta E_{ab}^* = \sqrt{(\Delta L^*)^2 + (\Delta a^*)^2 + (\Delta b^*)^2} \quad (i)$$

The average value of the color differences $\Delta E^*ab$'s which were obtained in terms of the images printed on the five recording papers is as shown in Table 3, and the color differences were evaluated in accordance with the following standard. The color differences shown in Table 3 are those values which were obtained in terms of the images printed by using the printer (1). Almost the same values were obtained even in the case where images were printed by using the printer (2).

In the table:

All of the color differences $\Delta E^*ab$'s of the images printed on the five recording papers are 20 or less: ⊚
At least one of the color differences is more than 20 and 30 or less: ○
Only one of the color differences is in excess of 30: △
Two or more of the color differences are in excess of 30: X Test A2: Quality of Image Alphabets and graphic images were printed by the printer (1) and (2) on each of the recording papers (1) to (5) with the inks of Examples and Comparative Examples. These images were visually observed, and evaluated according to the following standard:

Non-blurred, sharp images having excellent quality: ⊚
Scarcely-blurred, sharp images having good quality: ○
Scarcely-blurred, but slightly lacked in sharpness: △
Remarkably-blurred or lacked in sharpness: X Test A3: Water Resistance The samples of the solid image printed on the recording paper (3) with the printer (1), obtained in the Test A1 were dipped in tap water for one hour, pulled out, and dried spontaneously. With respect to these samples, the ΔE*ab's were obtained before and after the test in the same manner as in Test A1, and the results were evaluated in accordance with the following standard:

The remaining rate obtainable by the following equation (ii) is:
100–90%: ⊚
90–75%: ○
75–60%: Δ
60% or lower: X Equation (ii):

$$\text{Remaining Rate (\%)} = \frac{\Delta E^*ab \text{ after the test}}{\Delta E^*ab \text{ before the test}} \times 100 \quad \text{(ii)}$$

Test A4: Light Resistance

The samples of the solid image printed on the recording paper (3) with the printer (1), obtained in the Test A1 were placed in a transparent plastic cello case, and allowed to stand under the sunlight for 30 days. With respect to these samples, the ΔE*ab was obtained before and after the test in the same manner as in Test 1, and evaluation was carried out in accordance with the following standard:

The remaining rate obtainable by the above equation (ii) is:
100–90%: ⊚
90–75%: ○
75% or lower: X The results of the Tests 1 to 4 were as shown in Table 3.

TABLE 3

| | | Ink | | | | | | | | | | | | |
|---|---|---|---|---|---|---|---|---|---|---|---|---|---|---|
| | | Example A | | | | | | | | | | Comparative Example A | | |
| Test Item | | 1 | 2 | 3 | 4 | 5 | 6 | 7 | 8 | 9 | 10 | 1 | 2 | 3 |
| Test 1** Color Reproducibility | ΔE*ab Average Value* | 28.7 | 19.8 | 17.6 | 12.4 | 13.0 | 18.1 | 17.5 | 22.1 | 14.8 | 16.3 | 15.2 | 18.3 | 16.7 |
| | Judgement | ○ | ⊚ | ⊚ | ⊚ | ⊚ | ⊚ | ⊚ | ○ | ⊚ | ⊚ | ⊚ | ○ | ⊚ |
| Test 2** Quality of Image | (1) | ⊚ | ⊚ | ⊚ | ○ | ⊚ | ⊚ | ⊚ | ⊚ | ⊚ | ⊚ | ⊚ | ⊚ | ⊚ |
| | (2) | Δ | ○ | ⊚ | ○ | ⊚ | ○ | ⊚ | ⊚ | ⊚ | ⊚ | ⊚ | Δ | Δ |
| | (3) | ○ | ⊚ | ⊚ | ○ | ⊚ | ⊚ | ⊚ | ⊚ | ⊚ | ⊚ | ⊚ | ○ | ○ |
| | (4) | ○ | ⊚ | ⊚ | ○ | ⊚ | ⊚ | ⊚ | ⊚ | ⊚ | ⊚ | ⊚ | ○ | ○ |
| | (5) | ○ | ⊚ | ⊚ | Δ | ⊚ | ⊚ | ⊚ | ⊚ | ⊚ | ⊚ | ⊚ | ○ | ○ |
| Test 3 | Water Resistance | ⊚ | ⊚ | ⊚ | ○ | ⊚ | ⊚ | ⊚ | ⊚ | ⊚ | ⊚ | X | Δ | Δ |
| Test 4 | Light Resistance | ⊚ | ⊚ | ⊚ | ⊚ | ⊚ | ⊚ | ⊚ | ⊚ | ⊚ | ⊚ | X | ○ | ○ |

*: The color differences in Test 1 are those values which were obtained in terms of the images printed with the printer (1); almost the same values can be obtained even in the case where images are printed with the printer (2).
**: In Tests 1 and 2, the judgments on the images printed with the printer (1) were equal to those on the images printed with the printer (2).

Example B

Yellow, magenta and cyan inks, each having the composition shown in the following Table 4 were prepared in a conventional manner.

In the table, figures are in "% by weight" of the ink composition and the balances are water.

TABLE 4

| Formulation of Ink | | Example B1 | Example B2 | Example B3 | Comparative Example B1 |
|---|---|---|---|---|---|
| Yellow Dye | II-3 | 1.5 | | | |
| | III-5 | | 2 | | |
| | III-10 | | | 0.5 | |
| | C.I. Acid Yellow 23 | | | | 1.8 |
| Magenta Dye | IV-5 | | | | |
| | IV-6 | | | | |
| | IV-9 | | | | |
| | C.I. Acid Red 52 | | | | |
| Cyan Dye | I-4 | | | | |
| | I-3 | | | | |
| | I-13 | | | | |
| | C.I. Acid Blue 9 | | | | |
| Diethylene glycol | | 40 37 30 | 6 5 3.5 | 12 10 8 | 6 6 5 |
| Glycerol | | | 5 5 5 | | 5 5 5 |
| 2-Pyrrolidone | | | 5 5 5 | 10 10 10 | |
| Thiodiglycol | | | 4 4 4 | | |
| Ethanol | | | | 6 6 6 | |
| 2-Propanol | | | | | |
| Mildew-Proofing agent | | 0.3 0.3 0.3 | | | |

TABLE 4-continued

| Formulation of Ink | | Example B4 | Example B5 | Example B6 | Comparative Example B2 |
|---|---|---|---|---|---|
| Yellow Dye | II-2 | 1.5 | | | |
| | II-10 | | | 0.9 | |
| | III-3 | | 1.2 | | |
| | C.I. Direct Yellow 86 | | | | 1 |
| Magenta Dye | IV-1 | 2 | | | |
| | IV-4 | | | 0.9 | |
| | IV-10 | | 1.5 | | |
| | C.I. Direct Red 9 | | | | 3 |
| Cyan Dye | I-4 | | | 1 | 1 |
| | I-11 | | | 3 | 3 |
| | I-3 | | | 2 | |
| | I-15 | 3 | | | |
| Ethylene glycol | | | 12 12 7 | | 12 8 7 |
| Polyethylene glycol #200 | | | | 13 10 8 | |
| Glycerol | | 3 3 2 | | 10 10 10 | |
| Triethanolamine | | | | 1 | 1 |
| N-Methyl-2-pyrrolidone | | | 3 2.5 2 | | 3 2.5 2 |
| 1,3-Dimethyl-imidazolidinone | | 1 1 1 | | | 5 5 5 |
| Ethanol | | | | 8 8 8 | |
| 1-Propanol | | | | | |
| Mildew-Proofing agent | | 0.3 0.3 0.3 | 0.3 0.3 0.3 | 0.3 0.3 0.3 | 0.3 0.3 0.3 |

| Formulation of Ink | | Example B7 | Example B8 | Example B9 | Comparative Example B3 |
|---|---|---|---|---|---|
| Yellow Dye | II-8 | 1.4 | | | |
| | III-5 | | 1 | | |
| | III-7 | | | 1.6 | |
| | C.I. Acid Yellow 23 | | | | 1.2 |
| Magenta Dye | IV-1 | | 1.7 | | |
| | IV-8 | 2 | | | |
| | IV-9 | | | 2 | |
| | C.I. Acid Red 249 | | | | 1.4 |
| Cyan Dye | I-1 | | | 4.5 | |
| | I-3 | | 3.5 | | |
| | I-16 | 4 | | | |
| | C.I. Direct Blue 86 | | | | 2.5 |
| Diethylene glycol | | 15 13 10 | 18 15 12 | | 18 16 12 |
| Glycerol | | | | 10 10 8 | |
| Diethylene glycol monobutyl ether | | 15 15 15 | | | |
| Triethylene glycol monobutyl etyher | | | 8 8 8 | | 8 8 8 |
| Dipropylene glycol monomethyl ether | | | | 5 5 5 | |
| Surfynol 465 | | | 1 1 1 | 0.1 0.1 0.1 | 1 1 1 |
| Mildew-Proofing agent | | 0.3 0.3 0.3 | 0.3 0.3 0.3 | 0.3 0.3 0.3 | 0.3 0.3 0.3 |

| Formulation of Ink | | Example B10 | Example B11 | Example B12 | Comparative Example B4 |
|---|---|---|---|---|---|
| Yellow Dye | II-3 | 0.5 | | | |
| | III-8 | 0.5 | | | |
| | III-10 | | 1.8 | 3 | 1.8 |
| Magenta Dye | IV-5 | 2.2 | | 4 | |
| | IV-9 | | 2.5 | | |
| | C.I. Acid Red 289 | | | | 1.5 |
| Cyan Dye | I-4 | | 5 | 8 | |
| | I-13 | | 4 | | |
| | C.I. Direct Blue 199 | | | | 3 |
| Diethylene glycol | | 20 17 12 | 10 10 10 | | 10 10 10 |
| 1,5-Pentane diol | | | | 8 8 8 | |
| 1,2,6-Hexane triol | | 3 3 3 | | | |
| Glycerol | | | | 2 2 | |
| 2-Pyrrolidone | | | 6 5 2.5 | | 6 6 3 |
| Triethanolamine | | | 1 | 1 | 1 |
| 2-Propanol | | 3.5 3.5 3.5 | | | |
| Surfynol 465 | | | 1.5 1.5 1.5 | 2 2 2 | 1.5 1.5 1.5 |
| Duck Algin NSPL (Kibun Food Chemifa K.K.)** | | | | 0.005 0.005 0.005 | |
| Mildew-Proofing agent | | 0.3 0.3 0.3 | 0.3 0.3 0.3 | 0.3 0.3 0.3 | 0.3 0.3 0.3 |

*: Acetylene glycol surface active agent
**: Sodium alginate (water-soluble polymer)

Evaluation Test B

The inks of Examples B1 to B12 and of Comparative Examples B1 to B4 were evaluated in terms of the following Tests B1 to B3, with the above printer and recording papers.

Test B1: Color Reproducibility

Solid images (100% duty) of yellow, magenta, cyan, red, green, blue and black were printed with the above printer (1) on each of the recording papers (1) to (5) with the inks of Examples and Comparative Examples. The image of red was obtained by superposing the yellow and magenta inks one over the other; the image of green was obtained by superposing the yellow and cyan inks one over the other; the image of blue was obtained by superposing the magenta and cyan inks one over the other; and the image of black was obtained by superposing the yellow, magenta and cyan inks one over another.

With respect to the solid image (3×3 cm) of each color, the color-scale values L*, a* and b* according to the color-difference indicating system defined by CIE (Commision International de l'Eclairage) were measured by a Macbeth CE-7000 spectrophotometer (manufactured by Macbeth Corp.). The differences between the color-scale values measured and the color reference values according to ISO 2845-1975, shown in Table 5 were obtained, and the color difference was calculated by the above equation (i).

TABLE 5

| Color reference values of each color (ISO 2845-1975) | | | | | | | |
|---|---|---|---|---|---|---|---|
| | yellow | magenta | cyan | red | green | blue | black |
| L* | 90.7 | 48.4 | 53.9 | 47.4 | 47.6 | 19.2 | 28.6 |
| a* | −18.4 | 78.1 | −19.1 | 70.3 | −74.1 | 35.5 | 0.1 |
| b* | 91.1 | −7.1 | −54.2 | 47.5 | 23.2 | −53.0 | −2.5 |

The average value of the color differences ΔE*ab's which were obtained in terms of the images printed on the papers (1) to (5) was as shown in Table 6. The color reproducibility was evaluated in accordance with the following standard.

All of the color differences ΔE*ab's obtained in terms of the images of red, green, cyan and black are 20 or less: ⊚
At least one of the color differences is more than 20 and 30 or less: ○
At least one of the color differences is in excess of 30: X The results were as shown in Table 6.

Further, the same test was carried out with the printer (2), and almost the same results as the above were obtained.

Test B2: Water Resistance

The samples of the solid image printed on the recording paper (3), obtained in the Test B1 were dipped in tap water for one hour, pulled out, and dried spontaneously. With respect to these samples, the ΔE*ab was obtained before and after the test in the same manner as in Test B1, and evaluation was carried out in accordance with the following standard:

The remaining rate obtainable by the above equation (ii) is:

100–80% in all of the samples of seven colors: ⊚
80–60% in all of the samples of seven colors: ○
60% or lower in at least one of the samples of seven colors: X Test B3: Light Resistance The samples of the solid image printed on the recording paper (3), obtained in the Test B1 were place in a transparent plastic cello case, and allowed to stand under the sunlight for 30 days. With respect to the samples, the ΔE*ab was obtained before and after the test in the same manner as in Test B1, and evaluation was carried out in accordance with the following standard:

The remaining rate obtainable by the above equation (ii) is:

100–90% in all of the samples of seven colors: ⊚
90–75% in all of the samples of seven colors: ○
75% or lower in at least one of the samples of seven colors: X

TABLE 6

| | Test | | | | | | | | | |
|---|---|---|---|---|---|---|---|---|---|---|
| | Test B1 Color Reproducibility | | | | | | | | Test 2B | Test 3B |
| | ΔE*ab (Average value in 5 types of recording papers) | | | | | | | | Water | Light |
| Formulation of Ink | Yellow | Magenta | Cyan | Red | Green | Blue | Black | Judgement | Resistance | Resistance |
| Example 1 | 17.5 | 16.7 | 24.6 | 13.6 | 17.5 | 26.8 | 4.9 | ○ | ⊚ | ⊚ |
| Example 2 | 19.8 | 17.2 | 19.4 | 18.2 | 19.1 | 18.6 | 8.0 | ⊚ | ⊚ | ⊚ |
| Example 3 | 3.2 | 14.5 | 13.1 | 14.8 | 19.3 | 22.7 | 22.4 | ○ | ⊚ | ⊚ |
| Example 4 | 15.3 | 18.0 | 17.7 | 19.6 | 18.8 | 19.3 | 19.7 | ⊚ | ⊚ | ⊚ |
| Example 5 | 8.5 | 12.2 | 18.1 | 18.0 | 16.2 | 13.0 | 17.3 | ⊚ | ⊚ | ⊚ |
| Example 6 | 5.7 | 11.8 | 12.8 | 20.9 | 14.4 | 12.4 | 20.8 | ○ | ⊚ | ⊚ |
| Example 7 | 11.7 | 19.2 | 16.5 | 15.2 | 17.6 | 17.2 | 10.2 | ⊚ | ⊚ | ⊚ |
| Example 8 | 10.0 | 17.0 | 15.6 | 19.4 | 14.6 | 16.7 | 7.3 | ⊚ | ⊚ | ⊚ |
| Example 9 | 16.9 | 16.4 | 18.0 | 18.1 | 19.2 | 17.1 | 3.8 | ⊚ | ⊚ | ⊚ |
| Example 10 | 7.4 | 16.7 | 18.3 | 15.3 | 8.0 | 11.6 | 10.4 | ⊚ | ⊚ | ⊚ |
| Example 11 | 12.0 | 18.3 | 16.9 | 19.3 | 15.0 | 14.2 | 4.8 | ⊚ | ⊚ | ⊚ |
| Example 12 | 23.2 | 20.4 | 28.8 | 15.6 | 17.8 | 26.3 | 3.3 | ○ | ⊚ | ⊚ |
| Comparative Example 1 | 7.4 | 21.3 | 15.7 | 32.1 | 36.3 | 41.2 | 30.4 | X | X | X |
| Comparative Example 2 | 19.8 | 15.3 | 18.4 | 30.6 | 18.8 | 39.3 | 28.7 | X | X | X |
| Comparative Example 3 | 7.0 | 13.9 | 15.2 | 28.4 | 19.7 | 40.9 | 35.0 | X | X | X |
| Comparative Example 4 | 12.1 | 24.8 | 16.7 | 33.8 | 27.9 | 45.1 | 42.6 | X | X | X |

*: The values shown in the table are those obtained in terms of the images printed with printer (1). However, almost the same values were obtained even in the case where images were printed with the printer (2).

What is claimed is:

1. An ink set comprising yellow, magenta and cyan ink compositions, wherein the cyan ink composition comprises as a colorant the compound represented by the formula (I):

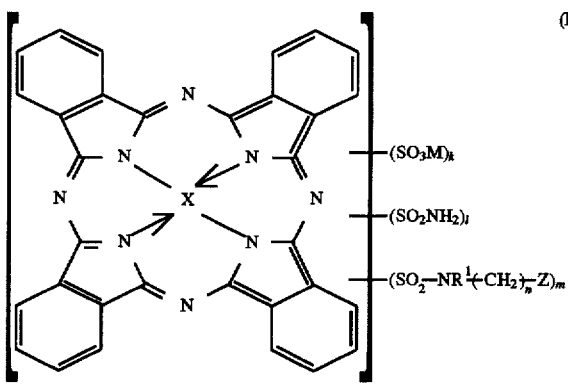

(I)

wherein

X represents an ion of a metal selected from the group consisting of Cu, Fe, Co and Ni, M represents hydrogen atom, an alkali metal, ammonium or an organic amine, $R^1$ represents hydrogen atom or an alkyl group which may be substituted, Z represents —OH, —COOH or $NR^2R^3$ where $R^2$ represents hydrogen atom or an alkyl group which may be substituted, and $R^3$ represents an alkyl group which may be substituted, or phenyl group which may be substituted, n represents an integer of 1 to 15, k and l each independently represent 0 or 1, and m represents an integer of 1 to 4, provided that k, l and m fulfill the inequality 2≦k+l+m≦4, b) the yellow ink composition comprises as a colorant
   i) a compound represented by the formula (II):

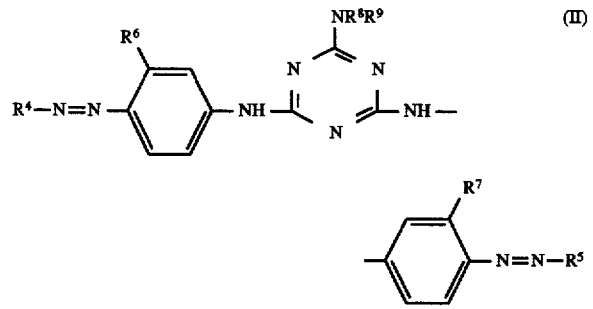

(II)

wherein $R^4$ and $R^5$ each independently represent —OH, or —$SO_3M$, or phenyl or naphthyl group substituted with —COOM, $R^6$ and $R^7$ each independently represent hydrogen atom, an alkyl group or an alkoxy group, $R^8$ represents hydrogen atom, an alkyl group or a hydroxyalkyl group, $R^9$ represents hydrogen atom, —OH or a hydroxyalkyl group, and M is as defined in the above formula (I); or ii) a compound represented by the formula (III):

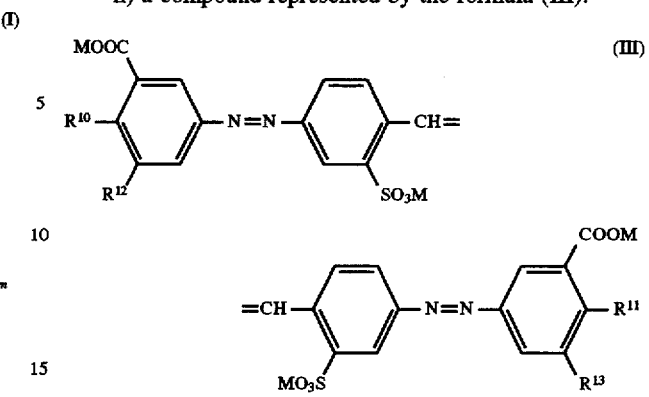

(III)

wherein $R^{10}$ and $R^{11}$ each independently represent hydrogen atom, —OH or an alkoxy group, $R^{12}$ and $R^{13}$ each independently represent hydrogen atom or an alkyl group, and M is as defined in the above formula (I), and c) the magenta ink composition comprises as a colorant a compound represented by the formula (IV):

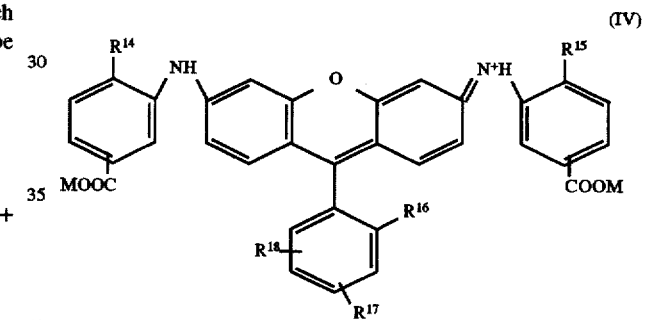

(IV)

wherein $R^{14}$ represents hydrogen atom or an alkyl group, $R^{15}$ represents hydrogen atom, a halogen atom or an alkyl group, $R^{16}$ represents —COOH or —$SO_3^-$, $R^{17}$ and $R^{18}$ each independently represent hydrogen atom, a halogen atom, an alkyl group or —$SO_3M$, and M is as defined in the above formula (I).

2. The ink set according to claim 1, wherein the cyan ink composition comprises water, a water-soluble organic solvent, and from 1.5 to 8.0% by weight of the compound represented by the formula (I), the yellow ink composition comprises 0.5 to 3.0% by weight of the compound represented by the formula (II) or (III), and the magenta ink composition comprises from 0.5 to 4.0% by weight of the compound represented by the formula (IV).

3. A method for forming a color image comprising the step of ejecting droplets of yellow, cyan and magenta ink compositions on a recording medium to form thereon a color image, wherein a) the cyan ink composition comprises as a colorant a compound represented by the formula (I):

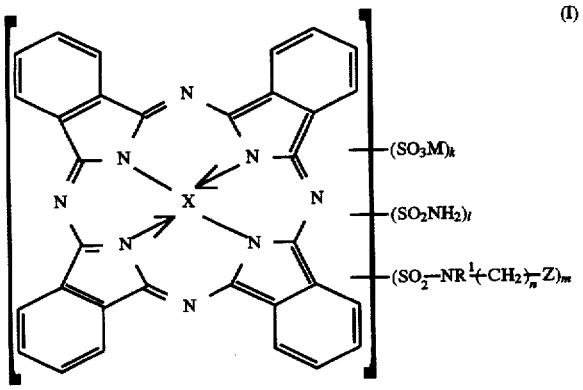

(I)

—(SO$_3$M)$_k$

—(SO$_2$NH$_2$)$_l$

—(SO$_2$—NR$^1$(CH$_2$)$_n$Z)$_m$ wherein

X represents an ion of a metal selected from the group consisting of Cu, Fe, Co and Ni, M represents hydrogen atom, an alkali metal, ammonium or an organic amine, R$^1$ represents hydrogen atom or an alkyl group which may be substituted, Z represents —OH, —COOH or NR$^2$R$^3$ where R$^2$ represents hydrogen atom or an alkyl group which may be substituted, and R$^3$ represents an alkyl group which may be substitute, or phenyl group which may be substituted, n represents an integer of 1 to 15, k and l each independently represent 0 or 1, and m represents an integer of 1 to 4, provided that k, l and m fulfill the inequality 2≦k+l+m≦4, b) the yellow ink composition comprises as a colorant
i) a compound represented by the formula (II):

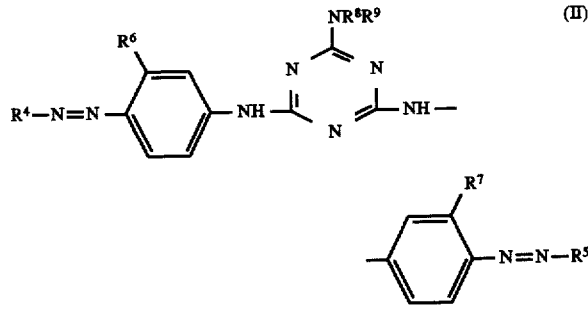

(II)

wherein

R$^4$ and R$^5$ each independently represent —OH, or —SO$_3$M, or phenyl or naphthyl group substituted with —COOM, R$^6$ and R$^7$ each independently represent hydrogen atom, an alkyl group or an alkoxy group, R$^8$ represents hydrogen atom, an alkyl group or a hydroxyalkyl group, R$^9$ represents hydrogen atom, —OH or hydroxyalkyl group, and M is as defined in the above formula (I); or ii) a compound represented by the formula (III):

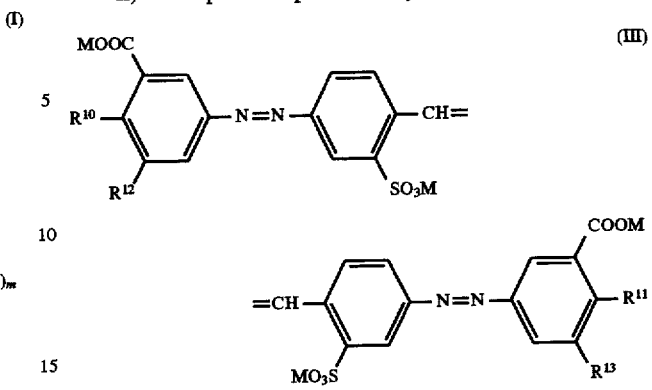

(III)

wherein

R$^{10}$ and R$^{11}$ each independently represent hydrogen atom, —OH or an alkoxy group, R$^{12}$ and R$^{13}$ each independently represent hydrogen atom or an alkyl group, and M is as defined in the above formula (I), and c) the magenta ink composition comprises as a colorant a compound represented by the formula (IV):

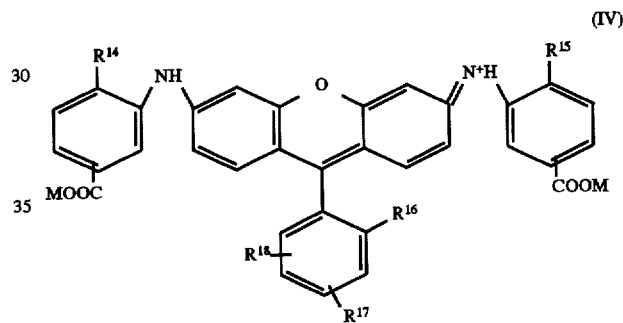

(IV)

wherein

R$^{14}$ represents hydrogen atom or an alkyl group,

R$^{15}$ represents hydrogen atom, a halogen atom or an alkyl group,

R$^{16}$ represents —COOH or —SO$_3^-$,

R$^{17}$ and R$^{18}$ each independently represent hydrogen atom, a halogen atom, an alkyl group or —SO$_3$M, and M is as defined in the above formula (I).

4. The method according to claim 3, wherein the cyan ink composition comprises water, a water-soluble organic solvent, and from 1.5 to 8.0% by weight of a phthalocyanine derivative represented by the formula (I).

5. The method according to claim 3, herein the color image includes a color of red, green or blue which is formed by superposing two of the ejected ink compositions selected from the group consisting of the yellow, cyan and magenta ink compositions.

6. The method according to claim 3, wherein the color image includes a color of black which is formed on the recording medium by superposing the ejected yellow, cyan and magenta ink compositions.

7. The method according to claim 3, wherein
the cyan ink composition comprises 1.5 to 8.0% by weight of the phthalocyanine derivative represented by the formula (I); the yellow ink composition comprises 0.5 to 3.0% by weight of the compound represented by the formula (II) or (III), and the magenta ink composition comprises 0.5 to 4.0% by weight of the compound represented by the formula (IV).

* * * * *